United States Patent [19]
Rokicki

[11] Patent Number: 5,954,904
[45] Date of Patent: Sep. 21, 1999

[54] FLOATING HEAD ASSEMBLY FOR A PULTRUSION PROCESS

[75] Inventor: Stanley Rokicki, 151 Snidercroft Rd., Concord, Ontario, Canada, L4K 2J8

[73] Assignee: Stanley Rokicki, Etobicoke, Ontario

[21] Appl. No.: 08/797,275

[22] Filed: Feb. 7, 1997

[30] Foreign Application Priority Data

Feb. 9, 1996 [CA] Canada ................................. 2169218

[51] Int. Cl.$^6$ ..................................... B29C 70/52
[52] U.S. Cl. ...................... 156/180; 156/166; 156/433; 156/441; 264/137
[58] Field of Search ................... 156/166, 180, 156/433, 441, 245; 264/137

[56] References Cited

U.S. PATENT DOCUMENTS

| | | | |
|---|---|---|---|
| 4,900,499 | 2/1990 | Mills | 156/180 X |
| 5,006,291 | 4/1991 | Fish | 156/180 X |
| 5,092,950 | 3/1992 | Spoo et al. | 156/180 |
| 5,192,383 | 3/1993 | Cavin | 156/180 |
| 5,198,172 | 3/1993 | Spoo et al. | 156/180 X |

Primary Examiner—Jeff H. Aftergut
Attorney, Agent, or Firm—Neil H. Hughes; Ivor M. Hughes; Marcelo K. Sarkis

[57] ABSTRACT

A head assembly for a pultrusion process for pultruding pultrudable material is provided. The head assembly includes a floating adjustable assembly carrying a pultrusion die. The die has a center line disposed proximate the center line of the process and an entrance, and an exit. The material passing from the entrance to the exit of the die in forming an acceptable finished shape is maintained when formed with the center line of the exit of the die always remaining stationary and disposed proximate the center line of the process. In order to ensure this position the pultrusion die is movably affixed with respect to a fixed frame by an adjustable head assembly to provide for adjustment of the entrance of the die with respect to the exit of the die, wherein should the center line of the form of the pultrudable material exiting the die be out of line with the predetermined limits from the center line of the process an adjustment of the head assembly will adjust the position of the entrance of the die with respect to the center line of the process and the exit of the die sufficiently until the center line of the pultrudable material is substantially in line with and within acceptable limits from the center line of the process and the exit from the die.

7 Claims, 14 Drawing Sheets

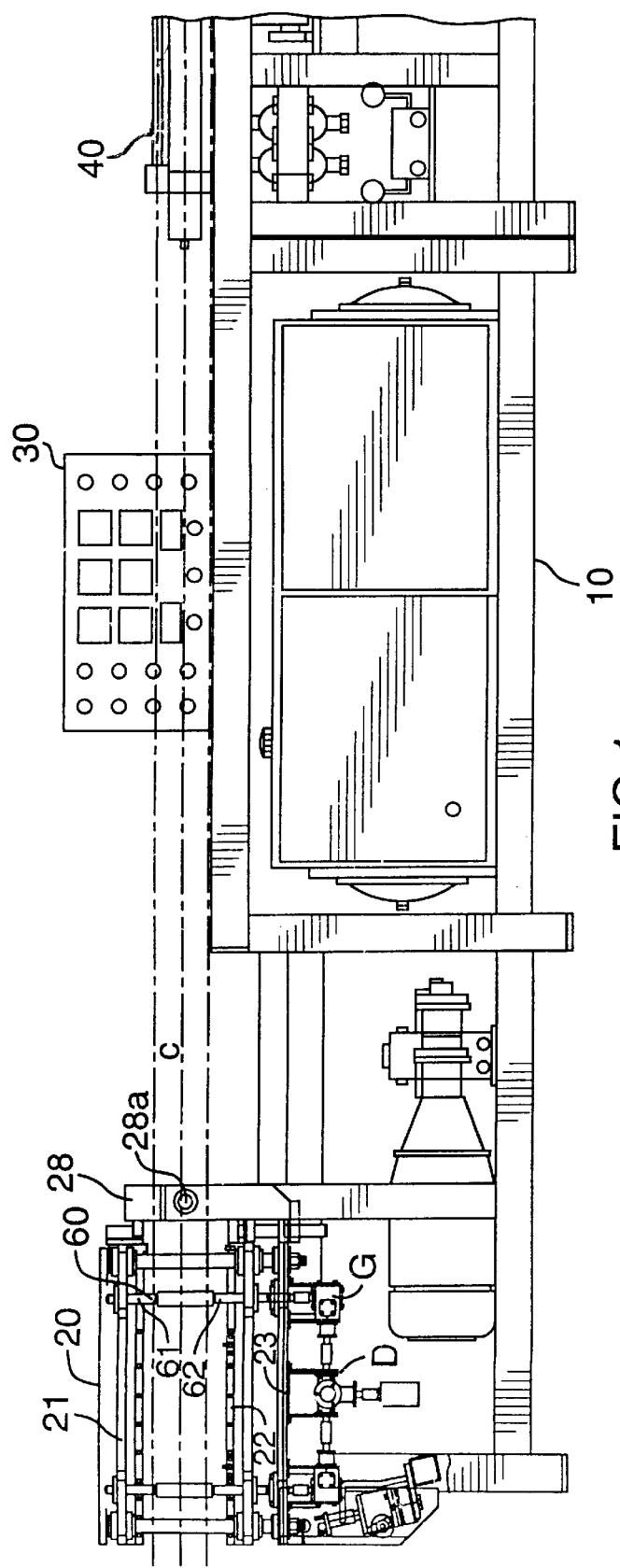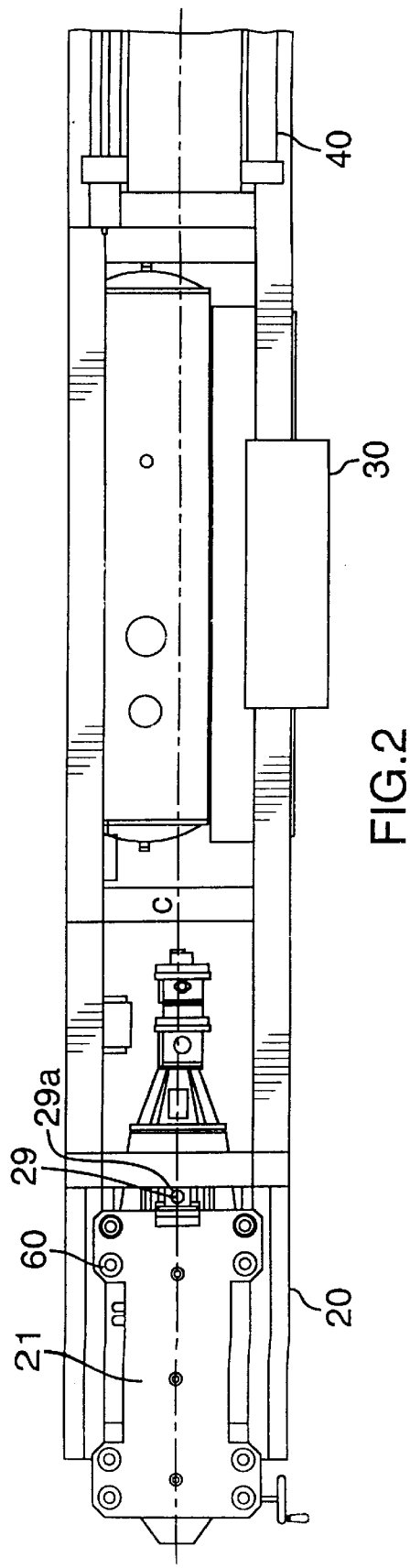

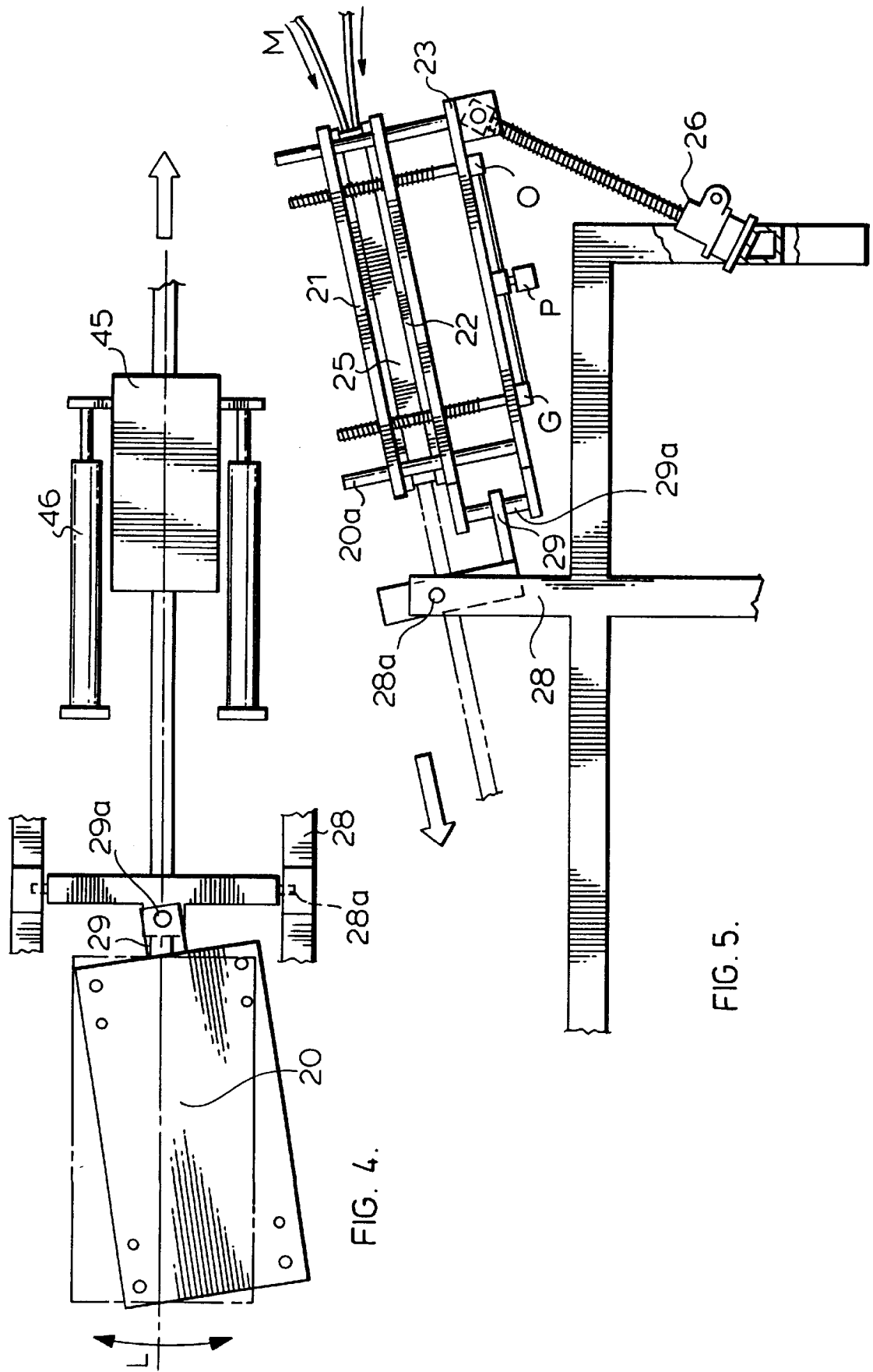

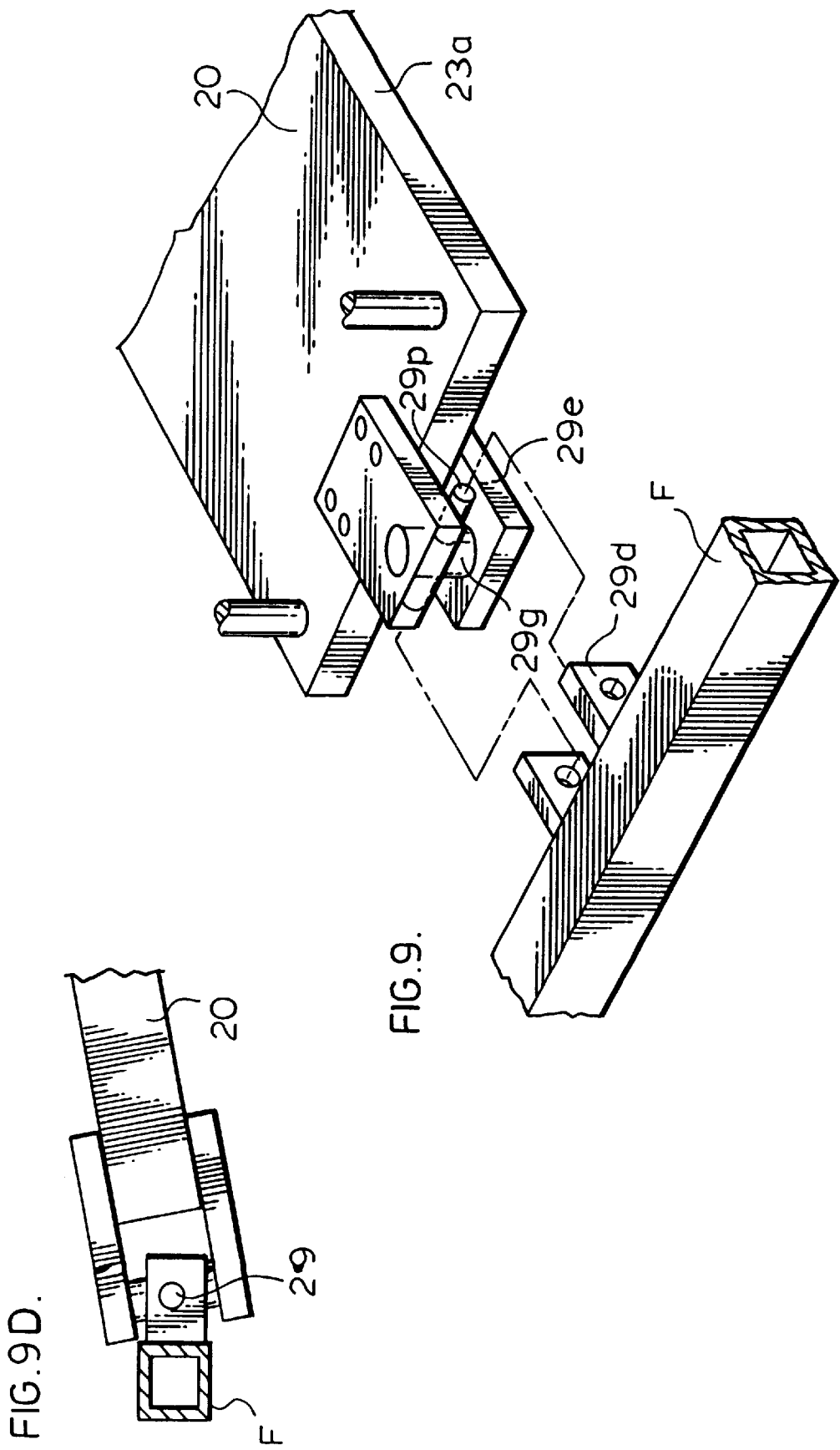

FLOATING HEAD ASSEMBLY FOR A PULTRUSION PROCESS

FIELD OF INVENTION

This invention relates to a pultrusion process including a floating head assembly and a puller apparatus therefor. Further, both the puller, and the floating head assembly individually, for use in a pultrusion process is claimed and may be utilized for manufacturing various products.

BACKGROUND OF THE INVENTION

It is known in the art to pultrude various products. Typically rovings made from fiberglass, graphite and/or other known materials are combined with resin with or without matting and following a preshaping step for these materials the entire mass is pulled through a die to form the desired shape. For example only, without limiting the application of the present invention to the window industry, when pultruding sections for window assemblies, doors, patio doors or the like, fiberglass rovings are fed from creels through a resin bath or other known techniques for coating the rovings prior to the preshaper. Matting may also be fed into the preshaper towards the die. At the die, which is normally heated, the product takes its final form exiting from the die in a semi-solid or semi-plastic condition. It is known in the art to use a pulling device to grab or engage a portion of the form being manufactured and thereby provide the pulling force required to move or pull the materials through the die. Normally two pulling devices are used in continuous sequentially alternating pulling and advancing steps to provide for the operation of a continuous process. From time to time the final form exiting the die will tend to bow, sag, or bend in an undesirable direction. This may be caused by the uneven distribution of rovings in the form being manufactured. For example the form may require four upstanding flanges from a base such as is the case in the manufacture of a door sill. In order to manufacture these flanges, extra glass roving loading is required. However the loading of the rovings to one side of the form, for example the top, may result in the bowing of the form upwardly away from the desired path. This bowing over time can cause considerable waste product being manufactured with known processes. Further considerable downtime of the production line may be experienced as the entire process must be cleared and cleaned prior to starting up the process again. Unfortunately it is the nature of the product being formed that causes the well known difficulties in pultruding successfully. Heretofore if any adjustment was to be made in the process to compensate for bowing of the finished product exiting the die, it would be accomplished by loosening the mounting bolts for the head assembly and thereafter jacking or shimming up the head assembly and/or the die. Such coarse adjustments may of course not solve the continuous ongoing problem of bowing of the forms being manufactured. Any lateral adjustments required would further complicate the situation. Other adjustments may be made at the puller by jacking up the puller. An adjustment is made in a direction tending to eliminate the bowing of the form. Often the adjustments are inadequate in spite of the best efforts of the individuals involved.

A problem therefore exists in the art to provide for a pultrusion process and a head assembly therein which recognizes the need to adjust the process from time to time in a predictable manner as forms being manufactured begin to bow, such adjustment being simply and easily carried out by an operator during operation of the pultrusion process, without the need for jacks, fork trucks or the like.

Nowhere within the prior art is there taught a pultrusion process and a method of pultruding including a floating head assembly which provides for means to adjust the process from time to time in a predictable manner as forms being manufactured begin to bow such adjustment being simply and easily carried out by an operator during operation of the pultrusion process.

It is therefore a primary object of this invention to provide a head assembly for a pultrusion process which overcomes the aforementioned problem in the art.

It is a further object of this invention to provide a head assembly for a pultrusion process which floats and is adjustable.

It is a further object of this invention to provide a head assembly for a pultrusion process which floats and is adjustable both laterally and vertically.

It is a further object of this invention to provide a puller assembly which is compatible with a floating adjustable head assembly for a pultrusion process.

It is yet a further object of this invention to provide a pultrusion process and a method therefore which allows for simple adjustment to correct for bowing of the product exiting the die.

Further and other objects of this invention will become apparent to a man skilled in the art when considering the following summary of the invention and the more detailed description of the preferred embodiments illustrated herein.

SUMMARY OF THE INVENTION

To these ends and according to a primary aspect of the invention there is provided a pultrusion process having a center line and being substantially fixed to a supporting surface and for pultruding pultrudable material, the pultrusion process comprising a floating adjustable head assembly having a front, rear, top, and bottom, and having disposed therewith a pultrusion die having an exit having a center line disposed proximate the center line of the process, said die having a front or entrance, and a rear or exit, the pultrudable material passing from the entrance of the die to the exit of the die and thus substantially forming a finished shape or form from the pultrudable material, the center line for acceptable pultrudable material extending within predetermined limits substantially along the center line of the process as the material passes from the exit of the die, the center line of the exit of the die always remaining stationary and disposed proximate the center line of the process, the die being fastened in position with respect to the head assembly by at least one mounting member also having a front, rear, top and bottom, the head assembly having disposed therewith proximate the rear thereof proximate the exit of the pultrusion die a fixed frame portion fixed in position with respect to the supporting surface, the at least one mounting member and hence the pultrusion die being movably affixed (for example pivotable) with respect to the fixed frame portion, the head assembly having disposed therewith at least one adjustment actuator to provide for adjustment of the head assembly and therefore the entrance of the die with respect to the exit of the die, the at least one adjustment actuator being fixed to the supporting surface and affixed with respect to the at least one mounting member and thereby providing the adjustment of the front of the head assembly, wherein should the center line of the form of the pultrudable material exiting the die be out of line with the predetermined limits from the center line of the process the adjustment actuator will upon the operation thereof adjust the position of the entrance of the die with respect to the center line of the process and the exit of the die by effecting the movement of the front of the at least one mounting member and therefore the front of the die with respect to the fixed frame portion sufficiently until the center line of the pultrudable material is again substantially in line with and within acceptable limits from the center line of the process and the exit from the die.

According to a yet another aspect of the invention there is provided a pultrusion process having a center line and being substantially fixed to a supporting surface and for pultruding pultrudable material, the pultrusion process comprising a floating adjustable head assembly having a front, rear, top, and bottom, and having disposed therewith a pultrusion die having an exit having a center line disposed proximate the center line of the process, said die having a front or entrance, and a rear or exit, the pultrudable material passing from the entrance of the die to the exit of the die and thus substantially forming the finished shape from or for the pultrudable material, the center line for acceptable pultrudable material extending within predetermined limits substantially along the center line of the process as the material passes from the exit of the die, the center line of the exit of the die always remaining stationary and disposed proximate the center line of the process, the die being fastened in position with respect to the head assembly by top and bottom mounting members also having a front, rear, top and bottom, the top and bottom mounting members being moveable with respect to one another by drive means connected to at least one of the mounting members and preferably indirectly to both members to effect the movement of the members towards and away from one another to fix the position of the die therebetween, the head assembly having disposed therewith proximate the rear thereof proximate the exit of the pultrusion die a fixed frame portion fixed in position with respect to the supporting surface and having disposed therewith pivot means, at least one of the mounting members and the pultrusion die being pivotably affixed with respect to the fixed frame portion proximate the pivot means by at least one pivot, the head assembly having disposed therewith at least one adjustment actuator to provide for adjustment and pivoting of the head assembly and therefore the die, the at least one adjustment actuator being fixed to the supporting surface and affixed with respect to proximate the front of at least one of the mounting members and thereby providing the adjustment of the head assembly, wherein should the center line of the form of the pultrudable material exiting the die be out of line with the predetermined limits from the center line of the process and the exit of the die, an adjustment may be made in the position of the entrance of the die and hence the center line of the pultrudable material with respect to the center line of pultrusion process and the exit of the die by adjustment of the adjustment actuator and effecting the pivoting of at least one of the mounting members and therefore the head assembly and the front of the die with respect to the fixed frame portion sufficiently until the center line of the pultrudable material is substantially in line with and within acceptable limits from the center line of the process and the exit of the die.

According to yet another aspect of the invention any pultrusion process and preferably the process of the present invention may further comprise a puller for pulling pultruded material having a center line substantially in line with the center line of the exit of the die of the preferred floating head assembly. The puller is fixed in position with respect to the supporting surface. The puller has moveable opposing portions and preferably top and bottom portions, each of said opposing portions having disposed therewith a capturing member of predetermined shape substantially consistent with the shape of the pultruded material exiting the die and thereby substantially circumventing and capturing the shape of the pultruded material when the portions and hence the members are moved towards one another. Preferably one of the portions is fixed to the housing, for example the cylinder of a double acting device such as a piston (for example hydraulic or pneumatic) engaged only with one portion of the puller, and the other portion being affixed to the drive mechanism, for example a piston. When the drive or piston is extended the two portions and hence the members will move away from one another and alternatively when the drive or piston is retracted the two portions and hence the members will move towards one another. Preferably the puller further comprises two pulling devices used in continuous sequentially alternating pulling and advancing steps to provide for the operation of a continuous process for the pultrusion process. The operator may determine by inspecting the pultruded product at the exit of the die or at the exit of the puller that an adjustment may be necessary to bring the center line of the pultruded material substantially within the predetermined limits from the center line of the exit of the die. Alternatively this may be accomplished by a process controller receiving feedback from sensors such as limit switches or lasers installed in the process. Adjustments may therefore be made manually or automatically to cause the actuator to move or pivot the head assembly and hence the center line of the exit of the die in a compensating direction until acceptable product is being manufactured. Any adjustment therefore will affect pultruded material exiting the die while it is still in a semi-plastic condition. This will therefore substantially eliminate the formation of microcracks in the product directly or indirectly when the product is in use.

According to yet another aspect of the invention the product being pultruded may further comprise lineals and sections used in the assembly of windows, doors, patio doors, sashes, sills, headers, or the like.

According to a yet another aspect of the invention there is provided a head assembly for a pultrusion process having a center line and being substantially fixed to a supporting surface and for pultruding pultrudable material, the head assembly comprising a floating adjustable assembly having a front, rear, top, and bottom, and having disposed therewith a pultrusion die having an exit having a center line disposed proximate the center line of the process in use, said die having a front or entrance, and a rear or exit, the pultrudable material passing from the entrance of the die to the exit of the die and thus substantially forming the finished shape or form of the pultrudable material, the center line for acceptable pultrudable material extending within predetermined limits substantially along the center line of the process as the material passes from the exit of the die, the center line of the exit of the die always remaining stationary and disposed proximate the center line of the process, the die being fastened in position with respect to the head assembly by at least one mounting member also having a front, rear, top and bottom, the head assembly having disposed therewith proximate the rear thereof proximate the exit of the pultrusion die a fixed frame portion fixed in position with respect to the supporting surface, the at least one mounting member and hence the pultrusion die being movably affixed (for example pivotable) with respect to the fixed frame portion, the head assembly having disposed therewith at least one adjustment actuator to provide for adjustment of the head assembly and therefore the entrance of the die with respect to the exit of the die, the at least one adjustment actuator being fixed to the supporting surface and affixed with respect to the at least one mounting member and thereby providing the adjustment of the front of the head assembly, wherein should the center line of the form of the pultrudable material exiting the die be out of line with the predetermined limits from the center line of the process the adjustment actuator will upon the operation thereof adjust the position of the entrance of the die with respect to the center line of the process and the exit of the die by effecting the movement of the front of the at least one mounting member and therefore the front of the die with respect to the fixed frame portion sufficiently until the center line of the pultrudable material is substantially in line with and within acceptable limits from the center line of the process and the exit from the die.

According to a yet another aspect of the invention there is provided a head assembly for a pultrusion process having a center line and being substantially fixed to a supporting surface and for pultruding pultrudable material, the head assembly comprising a floating adjustable assembly having a front, rear, top, and bottom, and having disposed therewith a pultrusion die having a center line disposed proximate the center line of the process, said die having a front or entrance, and a rear or exit, the pultrudable material passing from the entrance of the die to the exit of the die and thus substantially forming the finished shape or form of the pultrudable material, the center line for acceptable pultrudable material extending within predetermined limits along the center line of the process as the material passes from the exit of the die, the center line of the exit of the die always remaining stationary and disposed proximate the center line of the process, the die being fastened in position with respect to the head assembly by top and bottom mounting members also having a front, rear, top and bottom, the top and bottom mounting members being moveable with respect to one another by drive means connected to at least one of the mounting members and preferably indirectly to both members to effect the movement of the members towards and away from one another to fix the position of the die therebetween, the head assembly having disposed therewith proximate the rear thereof proximate the exit of the pultrusion die a fixed frame portion fixed in position with respect to the supporting surface and having disposed therewith pivot means, at least one of the mounting members and the pultrusion die being pivotably affixed with respect to the fixed frame portion proximate the pivot means by at least one pivot, the head assembly having disposed therewith at least one adjustment actuator to provide for adjustment and pivoting of the head assembly and therefore the die, the at least one adjustment actuator being fixed to the supporting surface and affixed with respect to proximate the front of at least one of the mounting members and thereby providing the adjustment of the head assembly, wherein should the center line of the form of the pultrudable material exiting the die be out of line with the predetermined limits from the center line of the process and the exit of the die an adjustment may be made in the position of the entrance of the die and hence the center line of the pultrudable material with respect to the center line of pultrusion process and the exit of the die by adjustment of the adjustment actuator and effecting the pivoting of at least one of the mounting members and therefore the head assembly and therefore the front of the die with respect to the fixed frame portion sufficiently until the center line of the pultrudable material is substantially in line with and within acceptable limits from the center line of the process and the exit of the die.

BRIEF DESCRIPTION OF THE DRAWINGS

The following figures illustrate preferred and alternative embodiments of the invention, wherein:

FIGS. 1, 1(a) and 1(b) illustrate a side-plan view of a pultrusion process incorporating a floating head assembly and the corresponding puller therefor illustrated in a preferred embodiment of the invention.

FIGS. 2, 2(a) and 2(b) are top-plan views of the pultrusion process illustrated in FIGS. 1, 1(a) and 1(b).

FIG. 4 is a top schematic view of the components illustrated in FIG. 3.

FIG. 5 is a schematic side plan view of the floating head assembly illustrated in a preferred embodiment of the invention.

FIG. 9 is another alternative embodiment of the floating head assembly.

FIGS. 9(a), 9(b), 9(c) and 9(d) provide more detailed information with respect to the alternative embodiment illustrated in FIG. 9, FIG. 9(a) being a top plan view, FIG. 9(b) being a side plan view, FIG. 9(c) being an end view, and FIG. 9(d) being a side view, all illustrated and in an alternative embodiment of the invention.

DETAILED DESCRIPTION OF PREFERRED EMBODIMENTS OF THE INVENTION

Figure 1A:
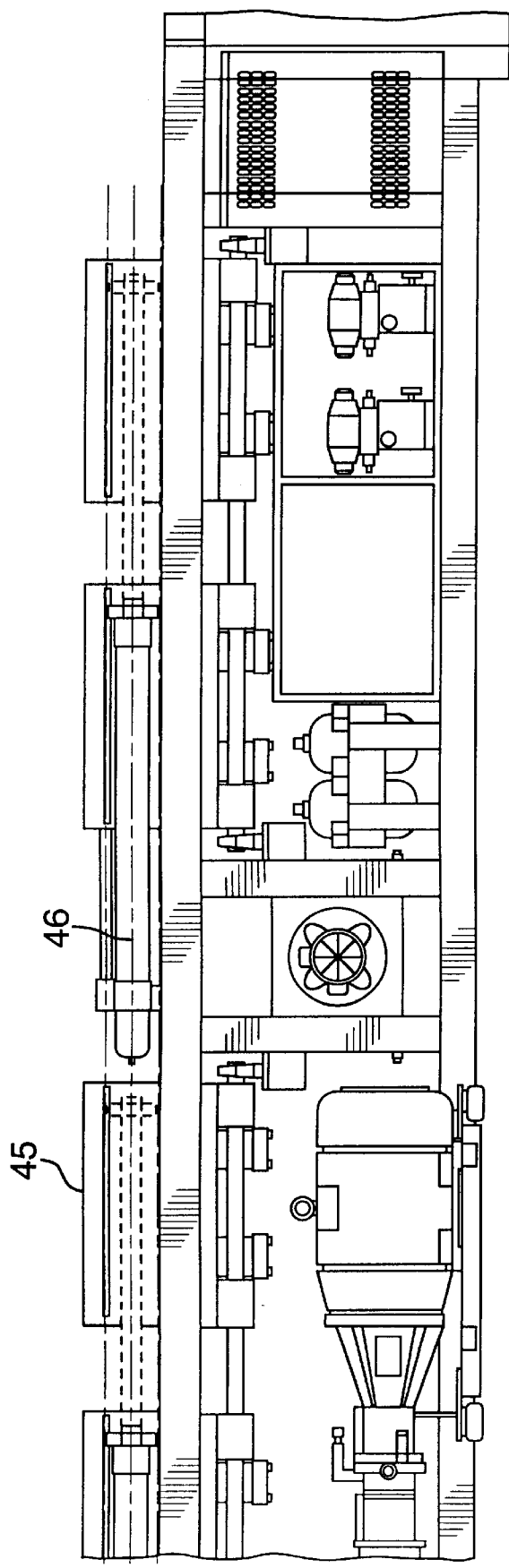
Figure 2A:
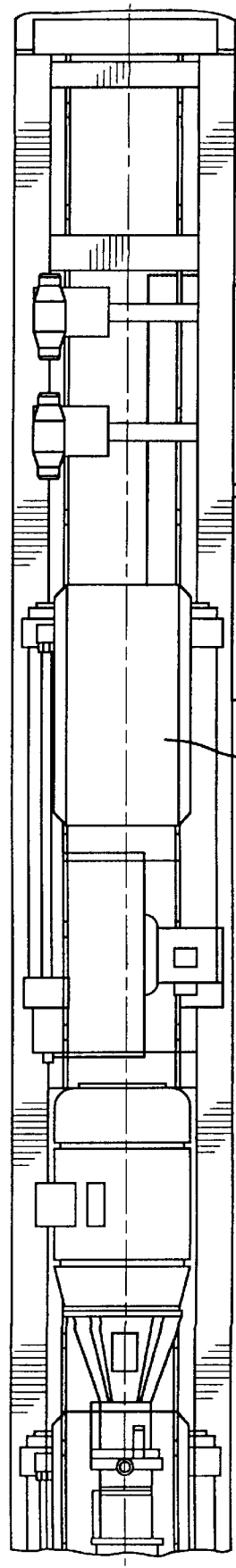

It is impossible to describe all the different embodiments head assemblies may take. All matter contained within the description of the preferred embodiment and alternative embodiments of the invention are considered to be representative of those which may be design by those skilled in the art to be analogous in use and therefor mechanical equivalents to the present invention.

"Pultrusion" is the "pulling" of continuous rovings, textured rovings, structural mats (reinforcements) and resin through a heated die in order to fabricate continuous profiles of constant cross section. During the process, rovings and mats are impregnated with resin by passing these materials through a "Resin Bath" or alternative. After being saturated, the materials may pass through a series of "pre-shapers" or pre-formers of any technology to partially form the finished shape of the form. The materials then pass through a heated, hardened, steel die which determines the final cross-sectional shape of the pultruded lineal. In most cases, the curing of the product occurs inside the die cavity which may be heated. As the strength of the product is a function of the roving loading, it may be desirable to pultrude components with a high percentage of reinforcements.

The pultrusion process described herein is capable of producing a wide range of fiber reinforced plastic materials.

The cross-section of the lineals produced is determined by the heated, forming die which is located at the entry end of the process. To change the shape of the material being manufactured, it is necessary to replace the existing die (and ancillary equipment) with the die for the new cross-section. The process may be utilized for the production of complex profiles using a single-cavity die or for the production of simpler shapes utilizing a multiple-cavity die.

The saturation of the fibers with a thermosetting resin is undertaken at a resin station which is situated upstream from the forming die. Many methods are available to impregnate the fibers with resin. No attempt is being made to discuss these methods as they are not part of the present invention.

Heat is applied to the die by means of electrical resistance heaters. Several zones of heating are provided in the top and bottom platens to assist in the control of the die profile. The temperature distribution is determined by thermocouples located within the platen zones and this information may be displayed at a control panel. The set point temperatures may be also displayed on programmable temperature controllers.

A main control panel is provided for the process and located between the die and the puller apparatus. All set up and processing adjustments may be initiated at this location by means of the appropriate selector switches and push buttons. Machine sequencing is effected automatically by a microprocessor based, programmable controller, which may be determined by operator input data. In addition to processing functions, the control panel may also include several diagnostic features to assist the operator in solving process related problems.

The process utilizes hydraulics for most of the functioning processes. The hydraulic unit is situated within the steel frame and is enclosed by sheet metal covers for safety precautions and to minimize exposure to dust. Cooling of the hydraulic oil is effected by means of a thermostatically controlled electric fan. Panel controls and gauges may be included to provide for individual adjustment of both the clamping and puller functions.

The process controlled puller system consists of two electronically synchronized, hydraulic, reciprocating "puller" units. The moveable clamps stroke upwards and downwards to grip the product between machined gripping pads. Two linear cylinders provide the force necessary to "pull" the lineal form from the die. The process may be cycled with one puller only, providing the controls are set for intermittent sequence; or, with both pullers in a continuous, reciprocating fashion. The pullers glide on stainless steel rails. Lineal ball bushings with two shafts per puller provide smooth, frictionless motion.

A travelling cut-off saw is located downstream of the pullers. This saw is used to cut the pultruded lineals to a pre-determined length, on-line, without interrupting the pultruding process. Upon receiving an electronic signal, the motor driven, cut-off blade is activated. The sequence of the cutting operation is controlled by the Process Controller and powered by a pneumatic driven motor.

Prior to cutting, the pultruded lineal advances onto a roller conveyor where it is cut to a pre-determined length. After cutting the finished product is, manually, removed and placed in a stacking station.

Puller System Pressure:

A pressure gauge may be used to display the hydraulic pressure at the pullers. Adjustment for this pressure may be accomplished by turning a hand-wheel valve. To minimize wear, it is desirable to operate the machine with the lowest possible pulling force. Maximum pull pressure for the puller is recommended to be 13.7 MPa (2000 psi).

A pressure gauge may be used to display the clamping pressure. To set the clamping pressure, the pressure is reduced during operation until slippage occurs and then increased until no further slippage occurs. Maximum clamp pressure for the unit is recommended to be 13.7 MPa (2000 psi).

It is recommended that the top platen be raised to allow room for the adjustment of the bottom platen. Once the bottom platen is in the proper position, the top platen can be lowered to contact the die.

Figure 6:
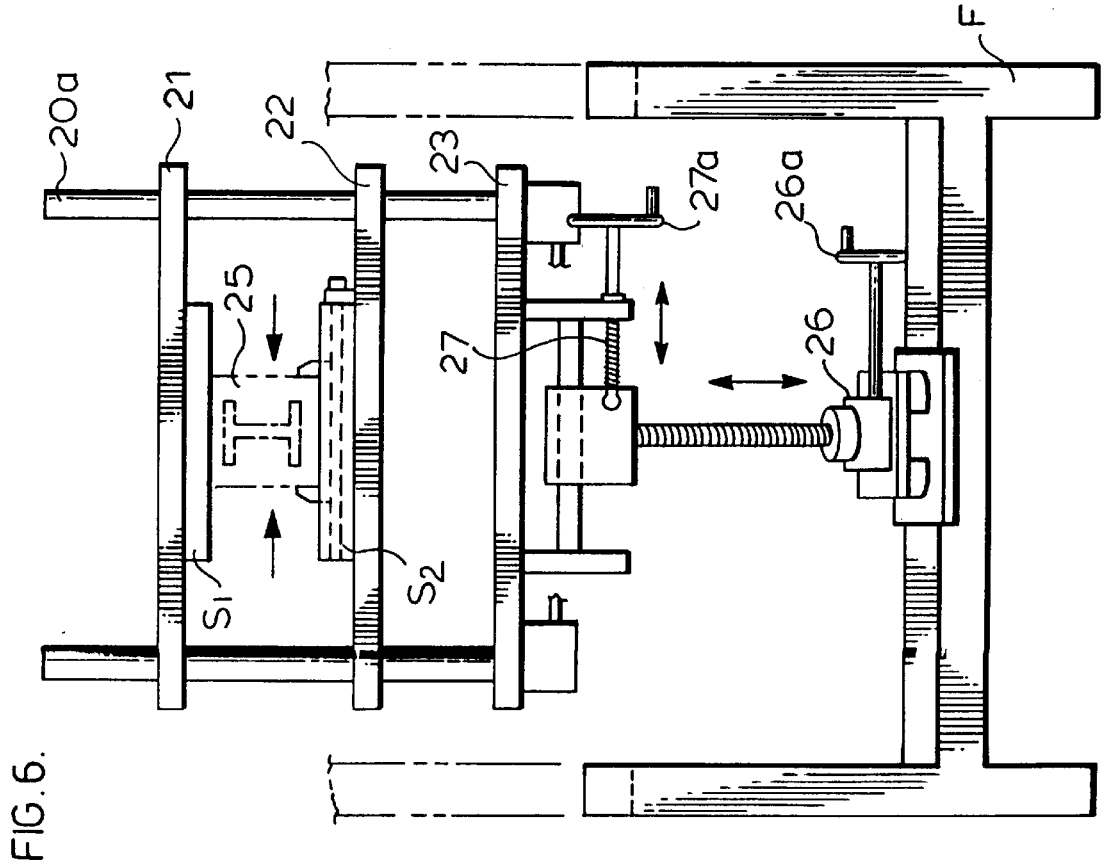
FIG. 6 is a front-end view of the floating head assembly illustrated in a preferred embodiment of the invention.
Figure 7:
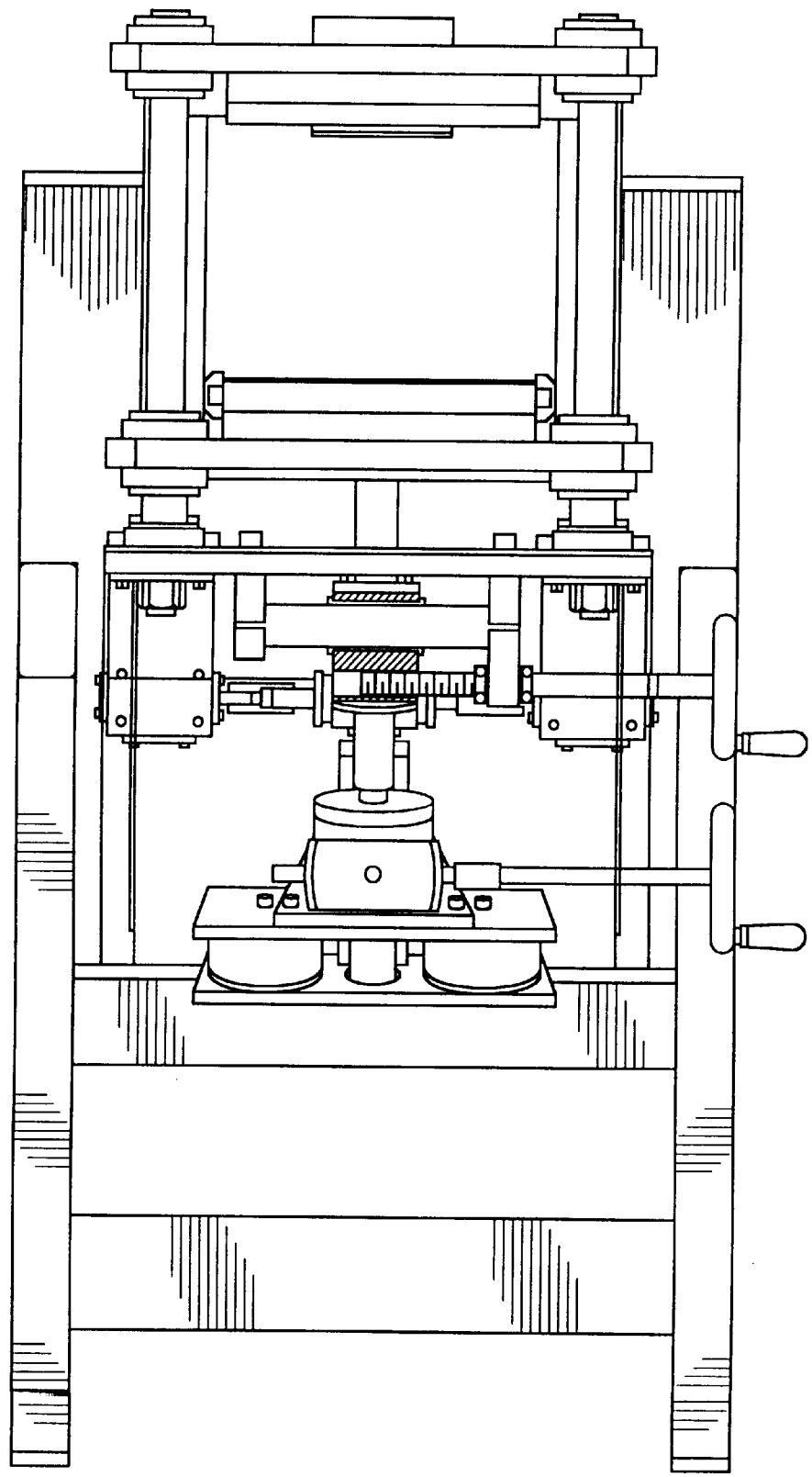
FIG. 7 is a similar view of FIG. 6.
Figure 7A:
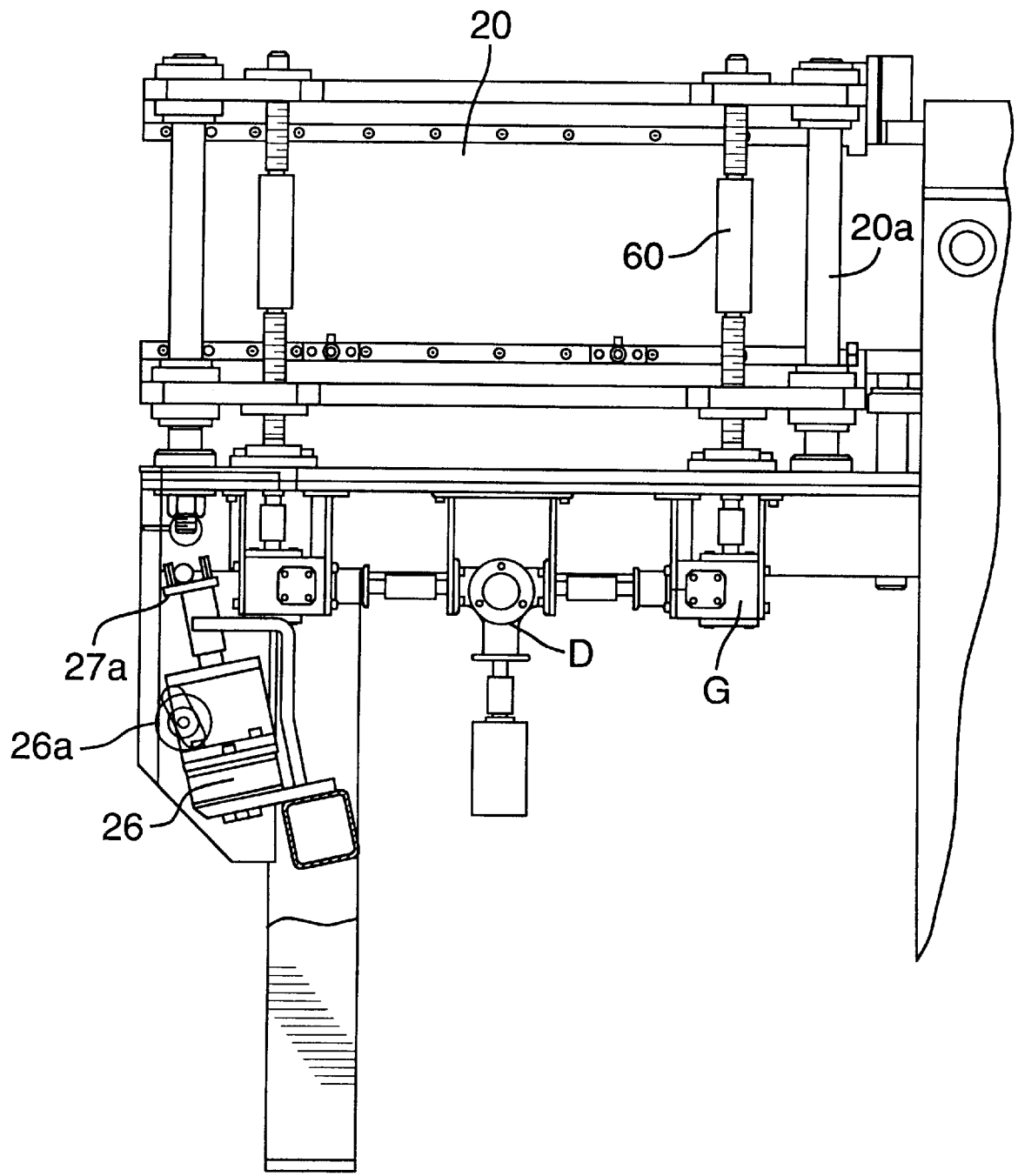
FIG. 7(a) is a side view of the floating head assembly illustrating the novel drive arrangement for the mounting members and illustrated in a preferred embodiment of the invention.

Referring generally to the Figures, there is provided a pultrusion process 10 including a floating head assembly 20, a control panel 30, a puller 40 and a saw. Material will therefore enter the process 10 after having been passed through a resin impregnation station or the like and a pre-shaper or pre-former step as described above. The pultrudable material therefore will enter the die 25, as best seen in FIG. 6, along the center line C of the pultrusion process. The die is retained within the floating head assembly 20 by plates 21 and 22. These plates will move in relation to one another by drive portions 60 which have alternative left and right thread 61 and 62 provided therewith. The drive 60 is engaged with a gear box G engaged with a drive D in a well-known worm and worm-wheel arrangement to effect the driving of the shaft 60. The left and the right thread therefore, depending on the direction of the drive 60, will either force the plates 21, 22 outwardly away from one another or inwardly toward one another to retain the die 25 therebetween. The plates 21 and 22, as best seen in FIG. 6, include stop portions S1 and S2 which thereby prevent the movement of the die in the pulling direction. The floating head assembly 20 has a support plate 23 provided therewith, as best seen in FIG. 5, which is engaged by the drive D near box G proximate the bottom thereof as well as by an adjustment actuator 26 and 27 which provide for the movement of the front of the head assembly proximate the input of the pultrudable materials into the die in both the horizontal and vertical planes. In this respect, therefore, the die may therefore be adjusted laterally and horizontally as best seen in relation to FIGS. 4 and 5 wherein by actuation of the adjustment mechanism 26, the front of the head assembly, and therefore the die is moved upwardly and pivoted with respect to a stationary frame portion 28 having pivotably affixed thereto a pivot 28a of the floating head assembly. The frame 28 is rigidly fixed to the supporting surface, and the pivot 28a is affixed thereto and to said frame as best seen in relation to FIG. 5. Further, a pivot 29 is provided and a pin 29a so that the lateral movement as best seen in FIG. 4 may be effected. Both the lateral movement of the head assembly 20L as seen in FIG. 4, and the vertical movement as seen in FIG. 5 do not affect the center line of the exit of the die in line with the center line C of the entire pultrusion process. Therefore, the pultrudable material M, as best seen in FIG. 5 as it enters the die, may be adjusted if the center line of the finished form is not substantially within the limits of the center line of the pultrusion process C and the exit of the die. The pullers 40 include alternating members 45 which ride on rails 46 and are hydraulically actuated as described above in general. The most important aspects of the puller 45 will be described in relation to FIGS. 10 and 11. The saw 50 is a well-known sawing device for cutting the lineals produced into pre-determined lengths. Therefore, this specification will not go into any further description as saws are well known in the art.

Figure 3:
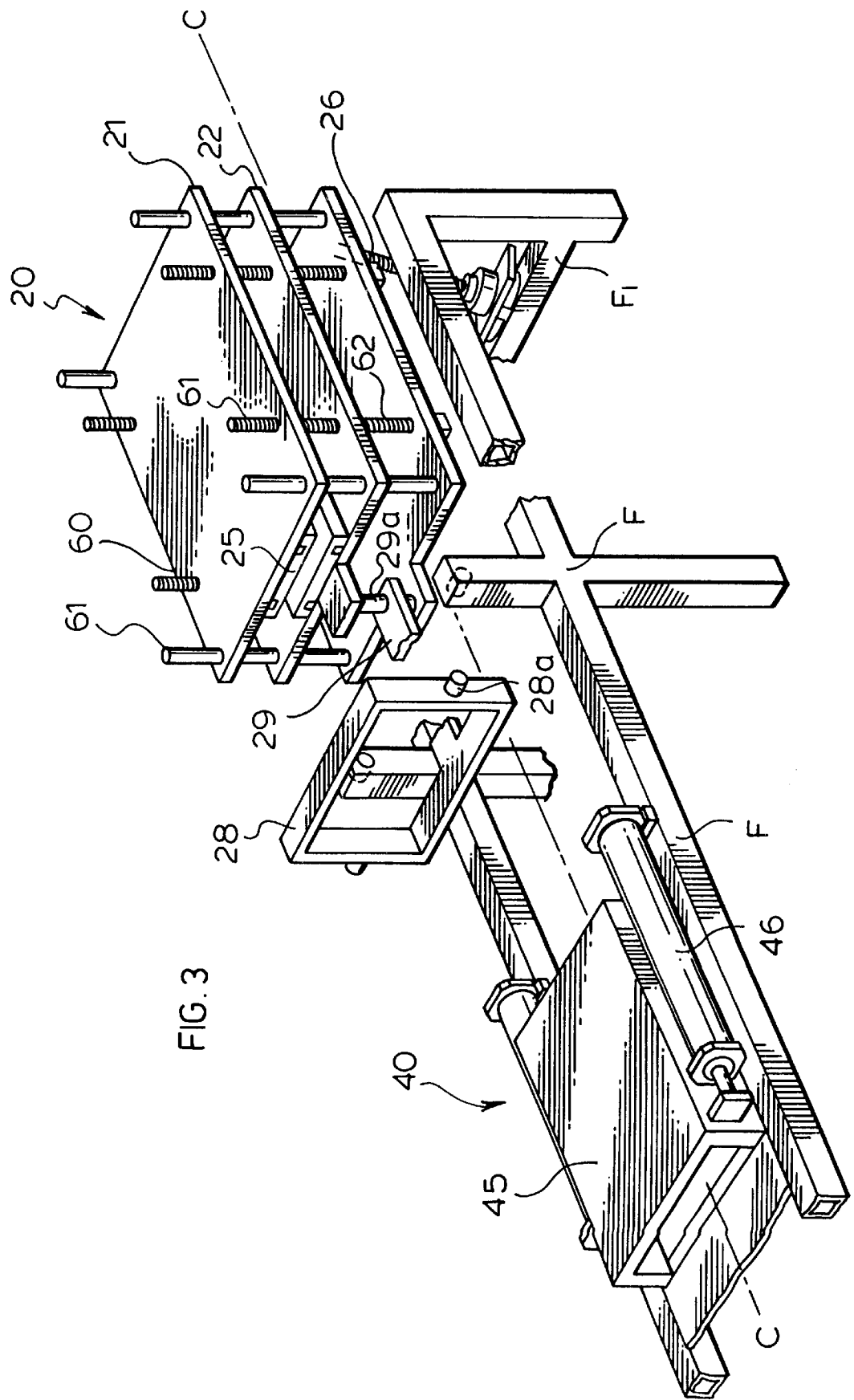
FIG. 3 is a schematic perspective view of the key components of the pultrusion process of FIG. 1 illustrated in a preferred embodiment of the invention.

Referring now to FIG. 3, there is illustrated the general concept of the pultrusion process with the head assembly 20 floating with respect to a frame portion 28, fixed to a framed portion F, and pivoting with respect thereto via pivots 28a and pivots 29a, affixed to the arm 29 extending from the frame portion 28. Further, the adjuster 26 is affixed to a horizontal leg portion F1 of the frame F. The pullers 40 are affixed in position and ride on rails 46 to alternate in sequence as is well known. The pullers 45 therefore will not be described any further, other than to state that the center line C of the process passes through the center of the clamping portions of the puller 45 which are always in line with the center line of the process. Only the head assembly 20 may be adjusted as previously described either laterally by the adjustment of the hand wheel 27a as best seen in FIG. 6 or alternatively by adjustment of the hand wheel 26a as best seen in FIG. 6. Such adjustment therefore will cause the pivoting of the front of the floating head assembly 20 with respect to the center line of the pultrusion process as seen in FIGS. 4 and 5. Therefore, manipulation of the hand wheel 26a will as best seen in FIG. 5 move the center line of the pultrudable materials M out of line with the center line of the process C with the exception of the center of the exit of the pultrusion die which remains substantially in line with the center line of the process at all times. In this way, an operator inspecting the output from the die can make an adjustment without stopping production should the output form be bowed or distorted in any undesirable manner in a direction to compensate for such bowing. Therefore, as seen in FIG. 5, such an adjustment would be made to compensate for the bowing of the finished product in an opposite direction. Similarly, when the hand wheel 27a is adjusted, the head assembly 20 will pivot laterally about the pivot 29a to adjust for any bowing of the material, for example in the opposite direction. As seen in FIG. 4, the center line of the puller remains along the center line of the process. As seen in FIG. 5, guides 20a are provided to provide ease of motion of the plates 21 and 22 with respect to one another when any adjustment is made with respect to the die. For example, if the die is changed, the plates 21 and 22 as best seen in FIGS. 5 and 6 will be moved away from each other, the die will then be removed, and the new die will replace the old die. The portions 21 and 22 will be moved again toward one another by the reverse threading as best seen in FIG. 5 as the plates move on the guides 20a.

Figure 8:
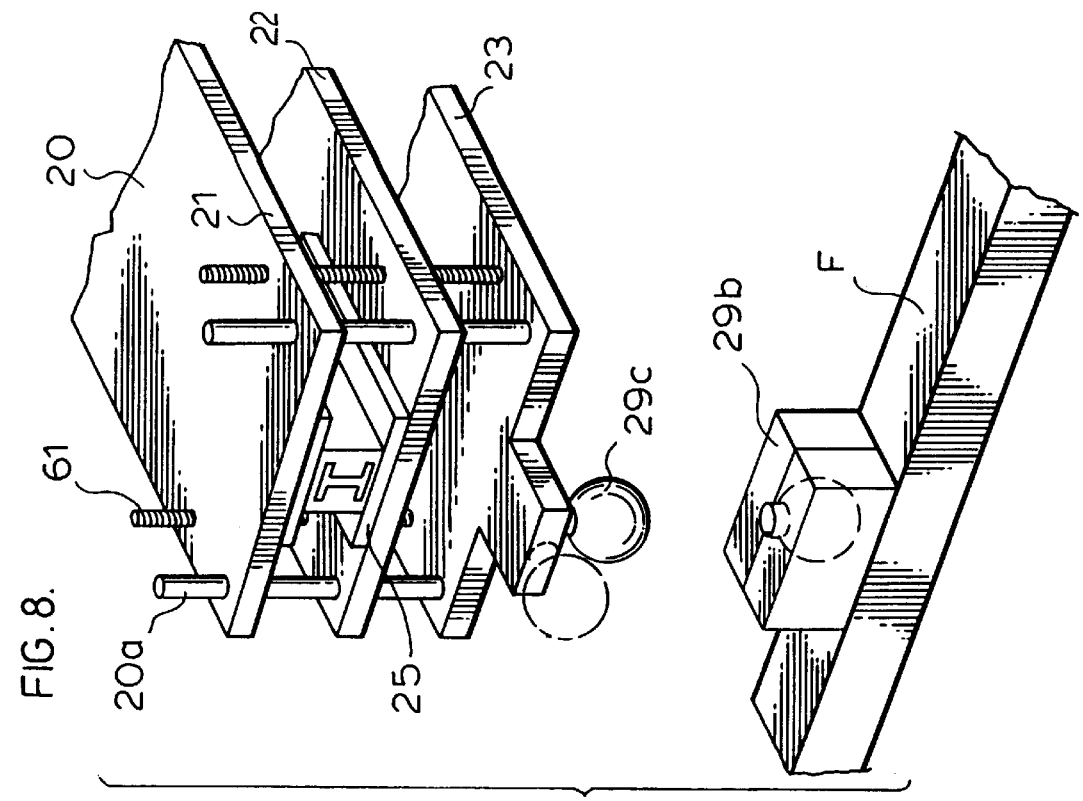
FIG. 8 is a schematic view of an alternative embodiment of the floating head assembly.

Referring generally to FIG. 8, there is illustrated an alternative embodiment of the invention wherein the floating head assembly 20 is formed substantially identically with those previously described with the exception that the pivots 29 and 28 are replaced with a ball and socket joint 29c and 29b, substantially as shown. The pivoting will then occur on the same universal pivot, 29c, in socket 29b in a similar manner. Adjustments may be affected identically to that described in relation to FIGS. 4 and 5.

Figure 9A:
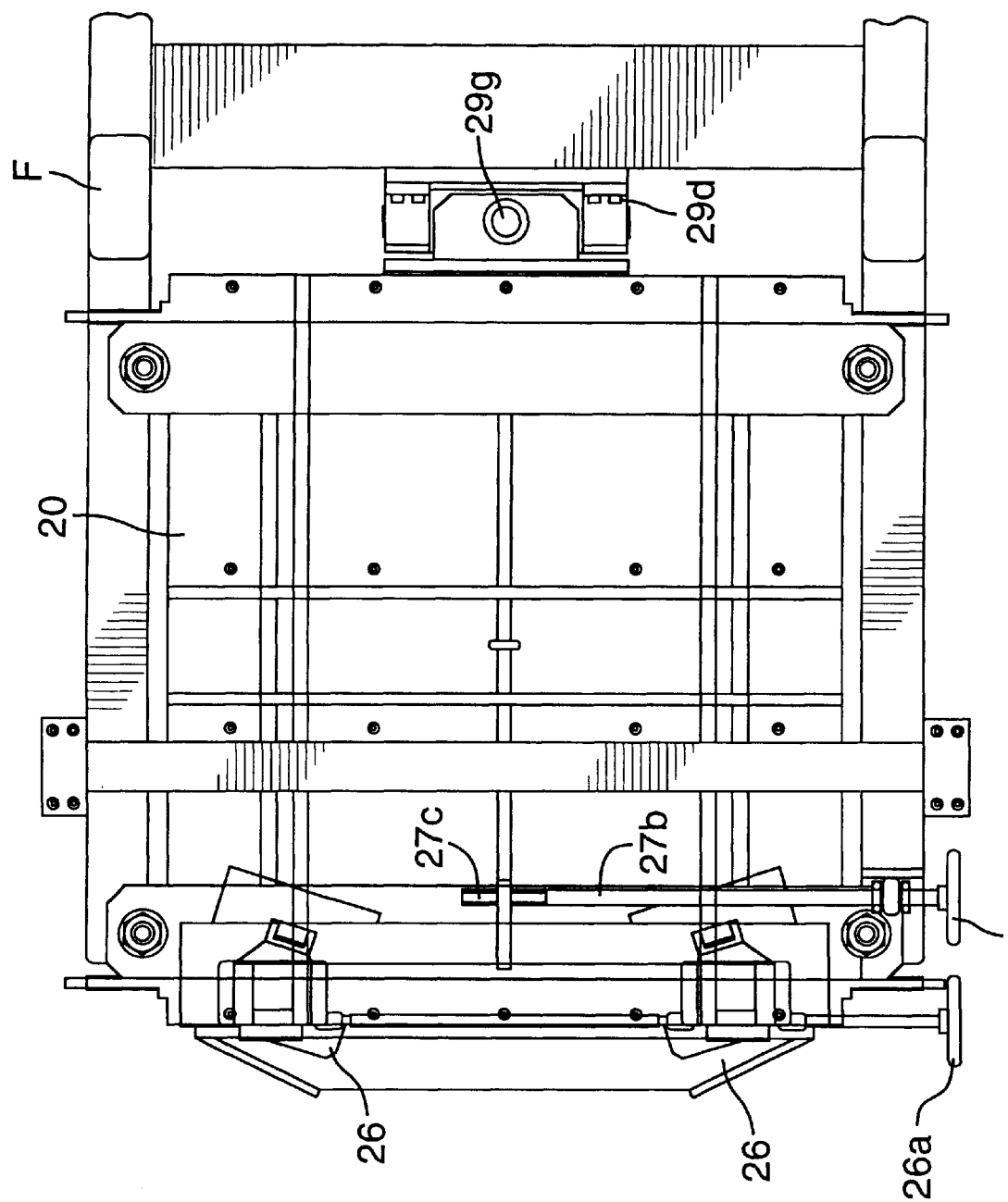
Figure 9B:
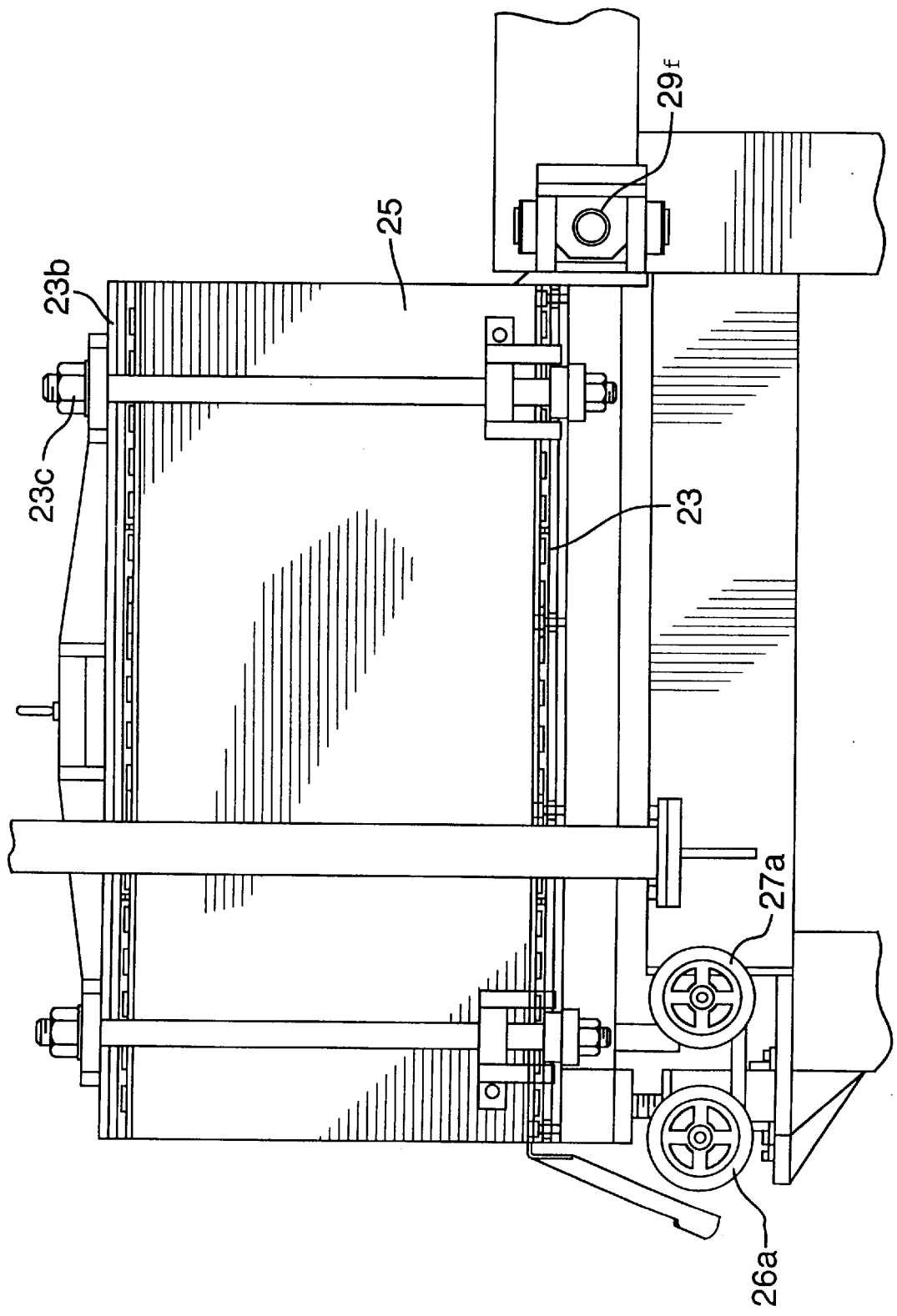
Figure 9C:
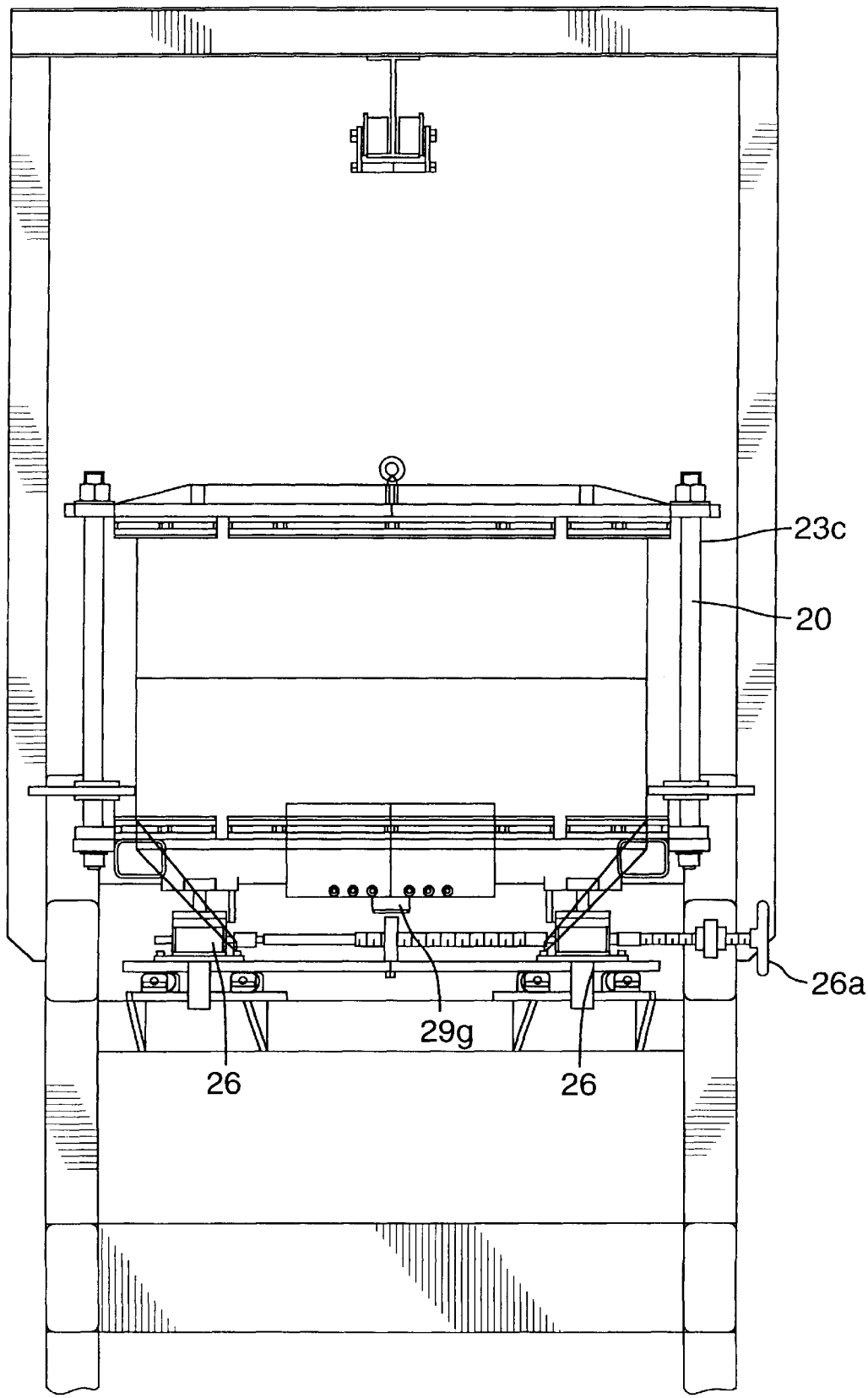

Referring to FIG. 9, there is illustrated an alternative embodiment of the invention wherein the pivoting of the head assembly 20 is effected in substantially a similar manner. However, the head assembly now includes only a supporting plate 23a which is adjusted laterally and vertically as previously described with the exceptions which will be described hereinafter. The pivot arrangement 29 will include portions 29e proximate the head assembly 20 including pivots 29f and 29g which engage with the openings within the frame tongue portions 29d and thereby effect the pivoting laterally and vertically. The only exception is that two jack portions 26 are provided which are driven by the operation of the handle 26a to provide for vertical adjustment of the head assembly 20. This is best seen in relation to FIG. 9a. Further, by adjustment of the handle 27a, the threaded end of the rod 27b at 27c engages with a threaded bore within the plate of the head assembly 20 and adjustment therefore laterally is provided. The die 25 as seen in FIG. 9b is substantially larger than the die shown in the previous figures. This die may be used for forming pultrusions, for example up to 60" and therefore the moveable plates seen in FIG. 1 for the head assembly are not utilized. The mounting member 23 therefore is utilized to clamp between it and a top plate 23b using tie rods 23c fastened with nuts as shown to provide the total die-retaining assembly. Adjustments are made as previously described.

Figure 1B:
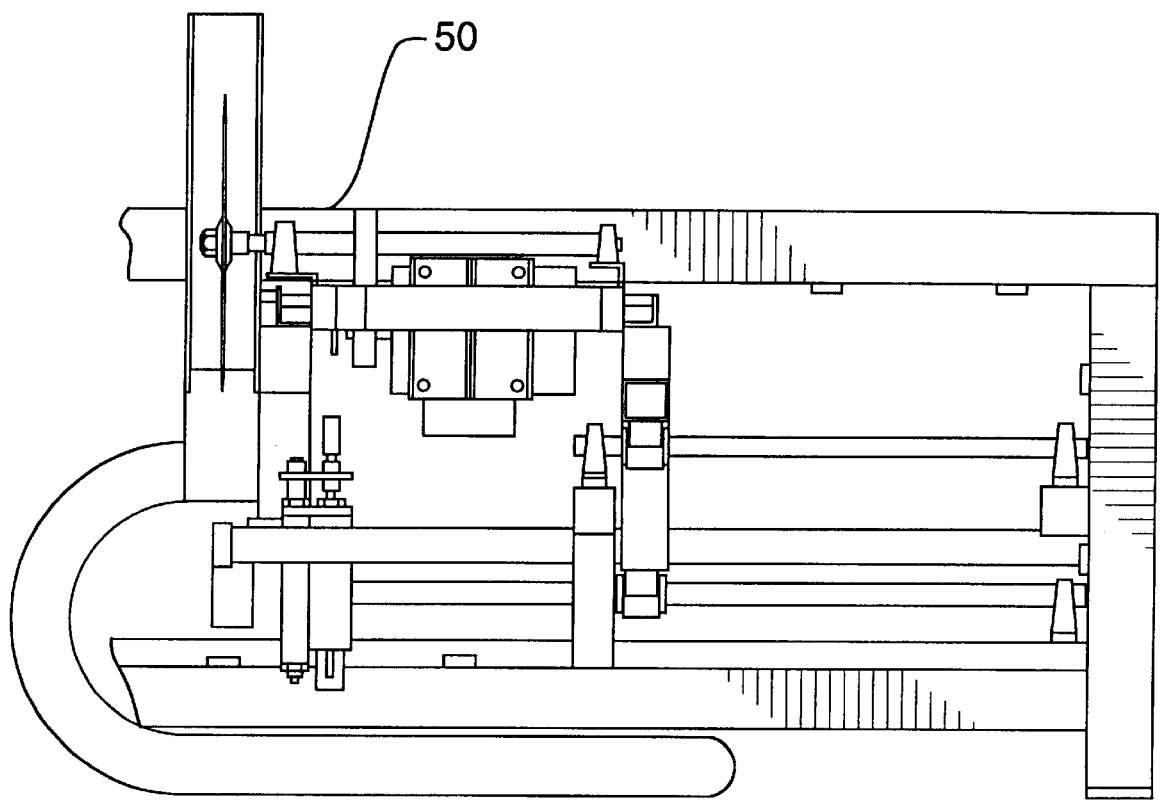
Figure 2B:
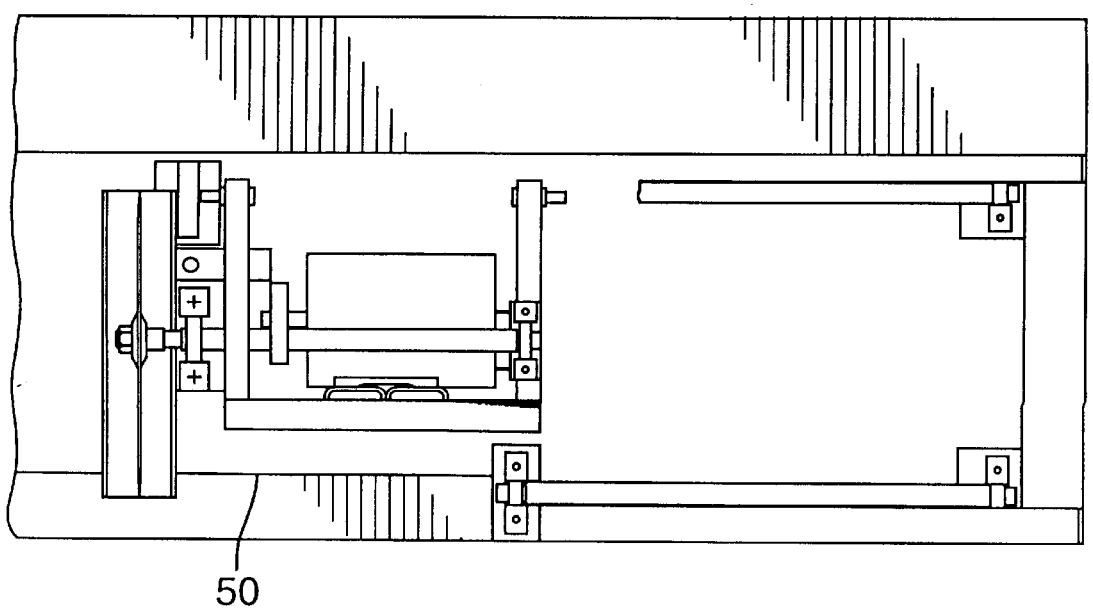
Figure 10:
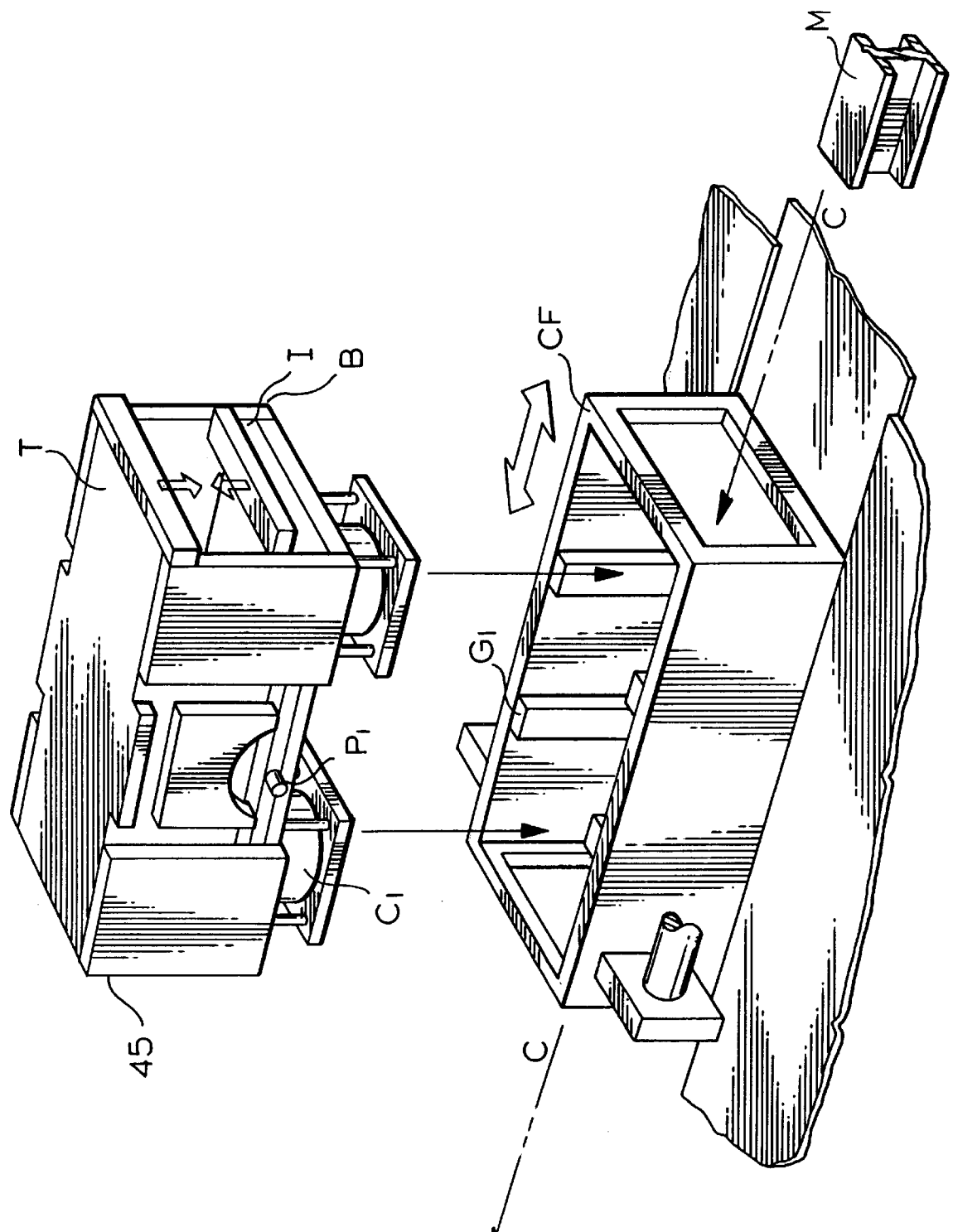
FIG. 10 is a cut-away perspective schematic view of the key components of the puller provided with the pultrusion process.
Figure 11:
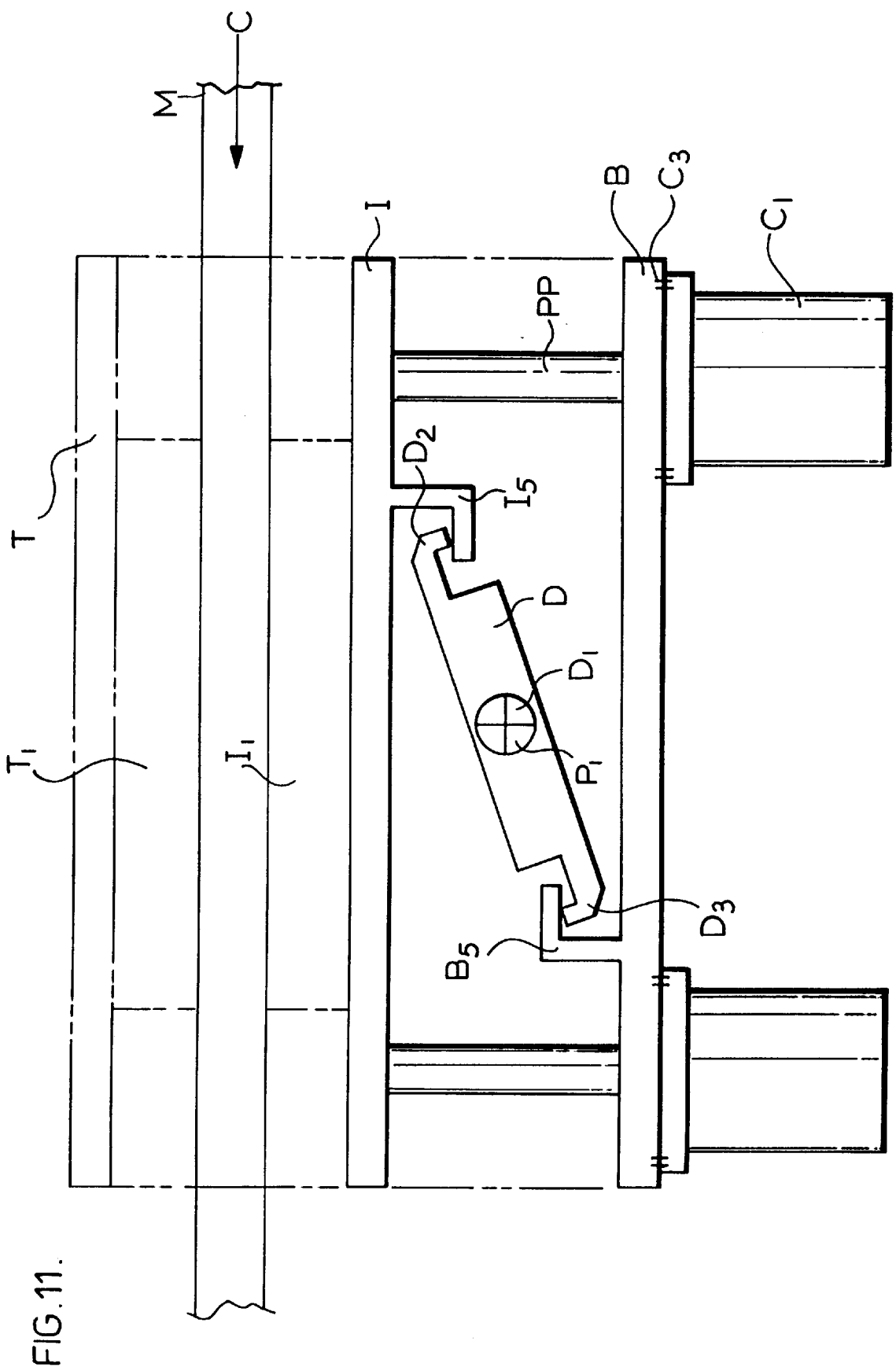
FIG. 11 is a side schematic view of the components making up the puller of FIG. 11 and the operation thereof illustrated in the preferred embodiments of the invention.

Referring now to FIGS. 10 and 11, there is illustrated the general operation of the pulling unit and the essentials of how the pulling assembly is adjusted to capture the profile being pultruded by clamps containing therebetween and surrounding the profile. Cylinders C1 are provided having pistons P not shown. The clamping unit 45 therefore includes a top T and a bottom B. The bottom B is affixed with respect to the cylinder C1. The intermediate plate I is affixed to the piston P, not shown. This assembly is therefore mounted within a carriage form CF utilizing the guides G1. The entire unit therefore is assembled substantially as shown in FIG. 1a and is moveable on the rails as shown. The pultrusion material M will therefore pass the center C of the clamps of pullers 45 as the clamps provide the forces previously described to sequentially pull and release the material M as seen in FIG. 10. In alternating sequence, the plates T and I will move with respect to one another, thereby causing the clamps to alternatively release and clamp the pultrusion profile M. The sequential movement of these plates is established by the dog D which is pivotably fixed at D1 to the pin P1 as seen in FIG. 11 which causes the cooperative motion of the plate I and the plate T with respect to one another as the platens T1 and I1 move inwardly and outwardly with respect to one another as these plates alternatively clamp and release the profile M also along the center line C of the process. The pistons PP as seen in FIG. 11 will move the plate I upwardly or downwardly depending on the stroke of the double-acting cylinder C1 which is affixed at fasteners C3 to the bottom plate B, which in turn is affixed by the frame of the puller to the top plate T. Therefore the top plate T and the bottom plate B which is fixed to the cylinder C1, which is not fixed to any other item, will move cooperatively as piston PP extends, for example, upwardly away from the cylinder. The movement of plate I will cause the cooperative motion of the teeth D3 and D2 of the dog D inter-engaging with the arms I5 and B5 of the plates B and I respectively.

Therefore, the pultrusion process includes a floating head assembly which retains one or more dies. The die includes an exit. The center line C of the process 10 and the center of the exit of the die 25 are always maintained in line regardless of any adjustment laterally or vertically made to the front of the assembly. It is the controlling and adjusting of center line of pultruded product in relation to the center line of the pultrusion process, in line with the center line of the puller, which allows for the adjustment so that the material M when exiting the exit, the die 25, which is still in a semi-plastic form, enables adjustments to be made without causing stress on the material. The entrance of the die therefore, being adjusted, and the material being sufficiently warm so as to be semi-plastic allows for any adjustments made either vertically or laterally by the operator. Any adjustment is passed on to the material exiting the die so that the material will tend toward the center line of the process by the adjustments of the operator. The material exiting the die will respond to the adjustments of the operator in that it is still semi-plastic, and it will not be stressed. In not being stressed, microcracks will not be formed. The formation of microcracks usually result in damaged product unacceptable to the consumer either initially, or when installed. For example, a window assembly may develop unsightly blemishes in the sash or framing sections of the window assembly two or three years after manufacture. It is therefore the elimination of the microcracks and the ability to straighten otherwise bowed material which makes the floating head assembly most desirable in a pultrusion process. Further, adjustments can be made continually without the necessity of shutting down the process or providing for an antiquated jacking, lifting, shimming or otherwise crude procedure to adjust the process.

As many changes can be made to the preferred and alternative embodiments of the invention without departing from the scope of the invention; it is intended that all material contained herein by interpreted as illustrative of the invention and not in a limiting sense.

The embodiments of the invention in which an exclusive property or privilege is claimed are as follows:

1. In a pultrusion process which includes pulling pultrudable material through a die the process having a center line and being substantially fixed to a supporting surface and for pultruding pultrudable material, the pultrusion process comprising a floating adjustable head assembly having a front, rear, top, and bottom, and having disposed therewith a pultrusion die having an exit having a center line disposed proximate the center line of the process, said die having an entrance, and an exit, the pultrudable material passing from the entrance of the die to the exit of the die and thus substantially forming a form from the pultrudable material, a center line for acceptable pultrudable material extending within predetermined limits substantially along the center line of the process as the material passes from the exit of the die, the center line of the exit of the die always remaining stationary and disposed proximate the center line of the process, the die being fastened in position with respect to the head assembly by at least one mounting member also having a front, rear, top and bottom, the head assembly having disposed therewith proximate the rear thereof proximate the exit of the pultrusion die a fixed frame portion fixed in position with respect to a supporting surface, the at least one mounting member and hence the pultrusion die being movably affixed with respect to the fixed frame portion, the head assembly having disposed therewith at least one adjustment actuator to provide for adjustment of the head assembly and therefore the entrance of the die with respect to the exit of the die, the at least one adjustment actuator being fixed to the supporting surface and affixed with respect to the at least one mounting member and thereby providing the adjustment of the front of the head assembly, wherein should the center line of the form of the pultrudable material exiting the die be out of line with the predetermined limits from the center line of the process the adjustment actuator will upon an operation thereof adjust the position of the entrance of the die with respect to the center line of the process and the exit of the die by effecting the movement of the front of the at least one mounting member and therefore the front of the die with respect to the fixed frame portion sufficiently until the center line of the pultrudable material is substantially in line with and within acceptable limits from the center line of the process and the exit from the die.

2. In a pultrusion process which includes pulling pultrudable material through a die the process having a center line and being substantially fixed to a supporting surface and for pultruding pultrudable material, the pultrusion process comprising a floating adjustable head assembly having a front, rear, top, and bottom, and having disposed therewith a pultrusion die having an exit having a center line disposed proximate the center line of the process, said die having an entrance, and an exit, the pultrudable material passing from the entrance of the die to the exit of the die and thus substantially forming a finished shape of the pultrudable material, a center line for acceptable pultrudable material extending within predetermined limits substantially along the center line of the process as the material passes from the exit of the die, the center line of the exit of the die always remaining stationary and disposed proximate the center line of the process, the die being fastened in position with respect to the head assembly by top and bottom mounting members also having a front, rear, top and bottom, the top and bottom mounting members being moveable with respect to one another by drive means connected to at least one of the mounting members and preferably indirectly to both members to effect the movement of the members towards and away from one another to fix a position of the die therebetween, the head assembly having disposed therewith proximate the rear thereof proximate the exit of the pultrusion die a fixed frame portion fixed in position with respect to a supporting surface and having disposed therewith pivot means, at least one of the mounting members and the pultrusion die being pivotably affixed with respect to the fixed frame portion proximate the pivot means by at least one pivot, the head assembly having disposed therewith at least one adjustment actuator to provide for adjustment and pivoting of the head assembly and therefore the die, the at least one adjustment actuator being fixed to the supporting surface and affixed with respect to proximate the front of at least one of the mounting members and thereby providing the adjustment of the head assembly, wherein should a center line of the form of the pultrudable material exiting the die be out of line with the predetermined limits from the center line of the process and the exit of the die an adjustment may be made in a position of the entrance of the die and hence the center line of the pultrudable material with respect to the center line of pultrusion process and the exit of the die by adjustment of the adjustment actuator and effecting the pivoting of at least one of the mounting members and therefore the head assembly and therefore the front of the die with respect to the fixed frame portion sufficiently until the center line of the pultrudable material is substantially in line with and within acceptable limits from the center line of the process and the exit of the die.

3. The pultrusion process of claim 1 or 2 further comprising a puller for pulling pultruded material having a center line substantially in line with the center line of the exit of the die of the floating head assembly, the puller being fixed in position with respect to the supporting surface, the puller having moveable opposing portions, each of said portions having disposed therewith a capturing member of predetermined shape substantially consistent with the shape of the pultruded material exiting the die and thereby substantially circumventing and capturing the shape of the pultruded material when the portions and hence the members are moved towards one another, one of the portions being fixed to a housing of a double acting device engaged only with the portions of the puller, and the other portion being affixed to the drive mechanism, whereby when a drive mechanism is extended the two portions and hence the members will move away from one another and alternatively when the drive mechanism is retracted the two portions and hence the members will move towards one another.

4. The pultrusion process of claim 3 wherein the puller further comprises two pulling devices used in continuous sequentially alternating pulling and advancing steps to provide for operation of a continuous process for the pultrusion process.

5. The pultrusion process of claims 1 or 2 wherein the product being pultruded further comprises lineals and sections used in the assembly of windows, doors, patio doors, sashes, sills and headers.

6. A head assembly for a pultrusion process having a center line and being substantially fixed to a supporting surface and for pultruding pultrudable material, the head assembly comprising a floating adjustable assembly having a front, rear, top, and bottom, and having disposed therewith a pultrusion die having an exit having a center line disposed proximate the center line of the process in use, said die having an entrance, and an exit, the pultrudable material passing from the entrance of the die to the exit of the die and thus substantially forming the finished form from the pultrudable material, the center line for acceptable pultrudable material extending within predetermined limits substantially along the center line of the process as the material passes from the exit of the die, the center line of the exit of the die always remaining stationary and disposed proximate the center line of the process, the die being fastened in position with respect to the head assembly by at least one mounting member also having a front, rear, top and bottom, the head assembly having disposed therewith proximate the rear thereof proximate the exit of the pultrusion die a fixed frame portion fixed in position with respect to the supporting surface, the at least one mounting member and hence the pultrusion die being movably affixed with respect to the fixed frame portion, the head assembly having disposed therewith at least one adjustment actuator to provide for adjustment of the head assembly and therefore the entrance of the die with respect to the exit of the die, the at least one adjustment actuator being fixed to the supporting surface and affixed with respect to the at least one mounting member and thereby providing the adjustment of the front of the head assembly, wherein should the center line of the form of the pultrudable material exiting the die be out of line with the predetermined limits from the center line of the process the adjustment actuator will upon an operation thereof adjust the position of the entrance of the die with respect to the center line of the process and the exit of the die by effecting a movement of the front of the at least one mounting member and therefore the front of the die with respect to the fixed frame portion sufficiently until the center line of the pultrudable material is substantially in line with and within acceptable limits from the center line of the process and the exit from the die.

7. A head assembly for a pultrusion process having a center line and being substantially fixed to a supporting surface and for pultruding pultrudable material, the head assembly comprising a floating adjustable assembly having a front, rear, top, and bottom, and having disposed therewith a pultrusion die having an exit having a center line disposed proximate the center line of the process, said die having an entrance, and an exit, the pultrudable material passing from the entrance of the die to the exit of the die and thus substantially forming a finished shape of the pultrudable material, the center line for acceptable pultrudable material extending within predetermined limits substantially along the center line of the process as the material passes from the exit of the die, the center line of the exit of the die always remaining stationary and disposed proximate the center line of the process, the die being fastened in position with respect to the head assembly by top and bottom mounting members also having a front, rear, top and bottom, the top and bottom mounting members being moveable with respect to one another by drive means connected to at least one of the mounting members and preferably indirectly to both members to effect the movement of the members towards and away from one another to fix the position of the die therebetween, the head assembly having disposed therewith proximate the rear thereof proximate the exit of the pultrusion die a fixed frame portion fixed in position with respect to a supporting surface and having disposed therewith pivot means, at least one of the mounting members and the pultrusion die being pivotably affixed with respect to the fixed frame portion proximate the pivot means by at least one pivot, the head assembly having disposed therewith at least one adjustment actuator to provide for adjustment and pivoting of the head assembly and therefore the die, the at least one adjustment actuator being fixed to the supporting surface and affixed with respect to proximate the front of at least one of the mounting members and thereby providing the adjustment of the head assembly, wherein should the center line of the form of the pultrudable material exiting the die be out of line with the predetermined limits from the center line of the process and the exit of the die an adjustment may be made in the position of the entrance of the die and hence the center line of the pultrudable material with respect to the center line of pultrusion process and the exit of the die by adjustment of the adjustment actuator and effecting the pivoting of at least one of the mounting members and therefore the head assembly and therefore the front of the die with respect to the fixed frame portion sufficiently until the center line of the pultrudable material is substantially in line with and within acceptable limits from the center line of the process and the exit of the die.

\* \* \* \* \*